STEEL SHELVING

Original Filed Sept. 12, 1963 3 Sheets-Sheet 1

INVENTORS:
IRWIN J. FERDINAND
DALE RAYMOND LOPATKA
BY Watson D. Haubaugh
ATT'Y

STEEL SHELVING

Original Filed Sept. 12, 1963 3 Sheets-Sheet 2

INVENTORS:
IRWIN J. FERDINAND
DALE RAYMOND LOPATKA
BY Watson D. Harbaugh
ATT'Y

STEEL SHELVING

Original Filed Sept. 12, 1963 3 Sheets-Sheet 3

INVENTORS:
IRWIN J. FERDINAND
DALE RAYMOND LOPATKA
BY Watson D. Haubaugh
ATT'Y

United States Patent Office

Re. 27,186
Reissued Oct. 12, 1971

27,186
STEEL SHELVING

Irwin J. Ferdinand, Glencoe, and Dale Raymond Lopatka, Lake Zurich, Ill., assignors to Hirsch Company Original No. 3,255,722, dated June 4, 1966, Ser. No. 308,533, Sept. 12, 1963. Application for reissue Jan. 21, 1970, Ser. No. 10,666

Int. Cl. A47b *9/00*

U.S. Cl. 108—144 35 Claims

Matter enclosed in heavy brackets [ ] appears in the original patent but forms no part of this reissue specification; matter printed in italics indicates the additions made by reissue.

*ABSTRACT OF THE DISCLOSURE*

*A knock-down metal shelving assembly is disclosed characterized in one embodiment by sheet metal shelves having depending peripheral opposing side flanges and end flanges which terminate in sharply square end edges at the cut-out corners to provide recessed openings to receive support columns with side portions that engage flat against the opening and a securing clip is disclosed with a centrally apertured wall that spans each corner, engages the flanges through tabs at spaced bearing points to hold the shelves to the support columns with the side flanges held endwise against the columns in a stress squaring relationship in cooperation with releasable securing means between the apertured wall and the support column. Other embodiments are disclosed.*

This application is a continuation-in-part of our co-pending application Serial No. 229,355, filed October 9, 1962, now abandoned, which in turn is a continuation-in-part of our co-pending application Serial No. 184,045, filed April 2, 1962, now abandoned, and incorporates claims allowed in our later continuation-in-part application Serial No. 368,634 of this application, which later application was filed May 19, 1964, and is now abandoned.

This invention relates in general to steel shelving and more particularly to fabricated lightweight shelving that is adjustably fastened on supporting columns for ready positioning and removal under rigidifying conditions without bracing struts.

Heretofore, steel shelving has generally involved considerable hazard due to sharp edges and corners, as well as undesirable mechanical complexity, requiring numerous motions and expense in assembling and fastening the shelving to the supporting columns.

Accordingly, the invention contemplates a steel shelving construction wherein the outlines of the shelves are sturdy and attractive with no sharp edges, and utilizes a simple, rigid and adjustable fastening construction between the shelves and the supporting columns.

The invention is further characterized wherein a shelf is secured to a supporting column having substantially U-shaped configuration with the surfaces of the column contacting each shelf in multiple vertical lines of contact at right angles to each other under pressures rigidifying the assembly solely at the shelf levels.

Also, the invention provides a steel shelving construction wherein sharply squared corner edges are rigidly held and protectively clamped against the supporting columns by concealed, but readily manipulated fastening elements, disposed within the confines of the supporting columns.

Another salient feature of the improved shelving construction of this invention includes reinforcing ribs formed in the supporting columns to provide additional reinforcement to the supporting columns and to provide an engaging surface for the fastening element at right angles to one another.

The invention also contemplates a fastening clip assembled to a shelf with a single movement and releasably retained in three planes at the corner junctures of the shelf to rigidify the corner structure, and in combination with a nut and bolt arangement, to clamp the shelf to the supporting columns with a rigidity that dispenses with side sway brackets.

Another feature of the fastening clip of this invention is one in which securement at the corner of a shelf, the strength and the rigidity of the corner and its securement to the supporting column is greatly enhanced as the weight supported on the shelf is increased.

The invention is also characterized by a shelf and supporting column construction which can be compacted for shipping in a space substantially the area of the shelf and one half the sum of the thicknesses of the shelves supplied.

The features of the present invention which are believed to be novel are set forth with particularity in the appended claims. The formation, inter-relationship, and securement of the steel shelving construction of this invention, together with further objects and advantages thereof, may best be understood by reference to the following description taken in connection with the accompanying drawings, in the several figures of which like reference numerals identify like elements, and in which:

Figure 1:
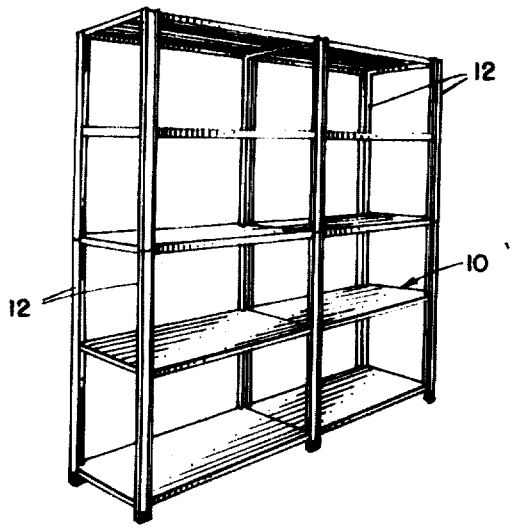
FIG. 1 is a front perspective view of a steel shelf construction according to the present invention.
Figure 2:
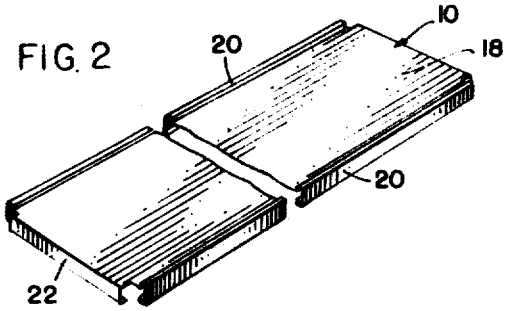
FIG. 2 is a fragmentary front perspective view of the shelf which is secured to the supporting columns.
Figure 3:
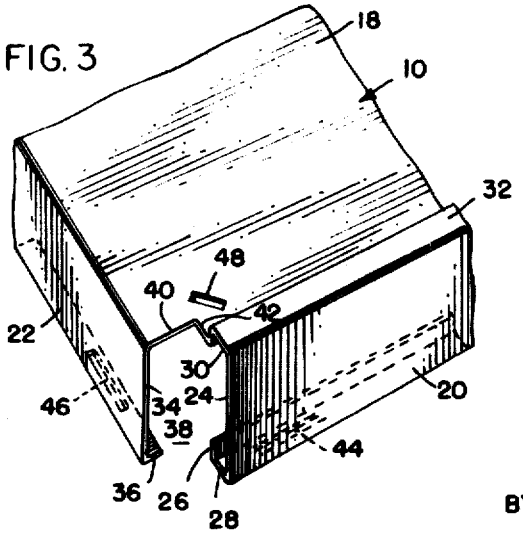
FIG. 3 is a fragmentary enlarged front perspective view of one corner of the shelf.

Referring now more particularly to FIGS. 1, 2 and 3, the shelf 10, preferably formed from sheet metal and coated, is secured at its four corners to the supporting columns 12. The shelf 10 is preferably rectangular and has an upper planar surface or top portion 18 with contiguous depending peripheral side flanges 20 and end flanges 22. The side and end flanges 20 and 22 define the features of the shelf and greatly increase the strength and rigidity of the shelf for load bearing purposes.

As best seen in FIG. 3, the side flanges 20 provide a substantially L shaped configuration having an outer portion 24 with the lower marginal edge 26 thereof reversely bent providing a lower portion 28 parallel to the planar portion 18 and with the periphery 26 thereof in a spaced parallel relationship with the outer portion 24. Preferably, the upper edge of the side flanges 20 are upwardly offset from the plane of the shelf, as at 30, to provide a shoulder 32 which prevents inward movement of the outer portion 24 under load conditions. The raised elevation of shoulder 32 also serves as a low rail to hold articles on the shelves.

The end flanges 22 also provide an L shaped configuration having an outer portion 34 with the lower marginal portion reversely bent back upon itself to provide a lower portion 36 of double thickness with the extreme marginal edge of the flange in parallel surface contact with the inner surface of the outer portion 34. The end flanges do not provide a portion elevated above the planar portion 18 since it is often desirable to place several shelves into an end to end abutting relationship.

Each of the four corners of the shelf are notched out to provide a recessed opening 38 defined by an end flange edge 40 and side flange edge 42. Each of the recessed openings 38 receive an angular portion of a supporting column to secure the shelf to the column as will be described.

A fastener securing aperture 44 is formed through the lower portion 28 of the side flanges at a predetermined distance from the edge 42 defining the recessed opening. A similar fastener securing aperture 46 is formed through the lower portion 36 of the end flange 22 at a predetermined distance from the edge 40 and an aperture 48 is formed in the planar portion 18 adjacent the inner corner of the recessed opening 38. Aperture 48 may be eliminated when using clips illustrated in FIG. 6. The apertures 44, 46 and 48 are preferably elongated to receive rectangular tabs on a fastening clip to be described.

Figure 7:
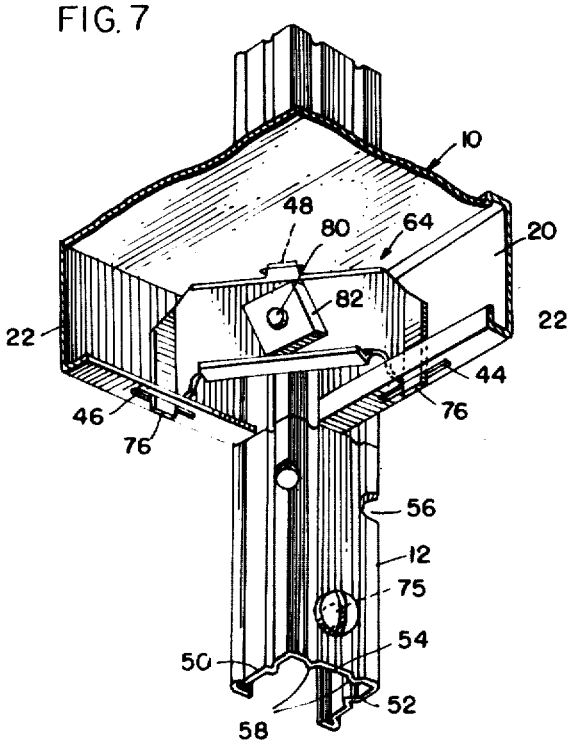
FIG. 7 is a fragmentary perspective view illustrating the relationship of the shelf shown in FIG. 3 when in the secured position held by the fasttening clip of FIG. 4 against a supporting column.
Figure 10:
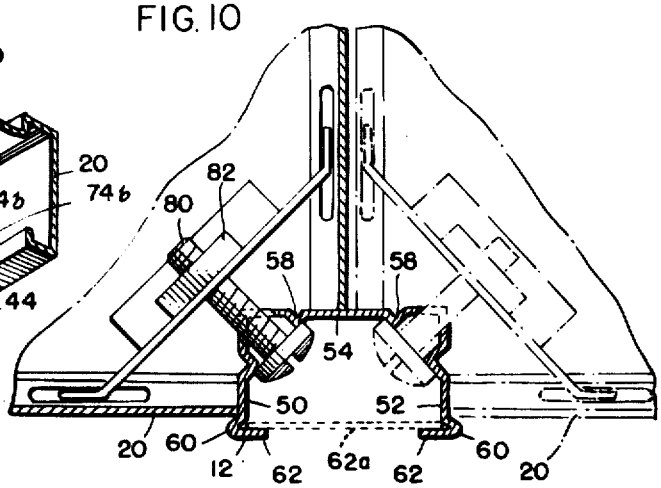
FIG. 10 is a fragmentary partially sectioned view illustrating the secured relationship of abutting shelves with a supporting column.

Referring now more specifically to FIGS. 7 and 10, the supporting columns 12 comprise a strip of heavy metal formed to provide an open channel configuration having identical outwardly extending sides 50 and 52 connected by a rear wall 54 and perforated at their junctures with a plurality of equally spaced apertures 56 to permit vertical adjustment of the shelves, preferably at one inch intervals.

The sides 50 and 52 and rear wall 54 of the supporting columns have concaved ribs 58 formed therein at predetermined laterally spaced intervals to increase the strength and rigidity of the column and to provide a bearing surface for the head portion of a fastening bolt to be described. The rear wall also contains apertures 75 at both ends for the purpose of allowing vertical attachment of end-abutting supporting columns.

The outwardly extending edge portion of the side walls 50 and 52 of the channel shaped support columns are angularly contoured to provide a convex rib 60 with the edge of the side walls bent inwardly to form a lip portion 62 substantially parallel to the rear wall 54. The lip portion 62, in addition to greatly increasing the strength and rigidity of the support columns, eliminates outwardly extending sharp edged surfaces, partially conceals the fastening bolts and, as set forth in our co-pending application Serial No. 184,045, previously referred to, may be used to retain a cover strip of any suitable design in the position represented by dotted lines 62a.

Figure 4:
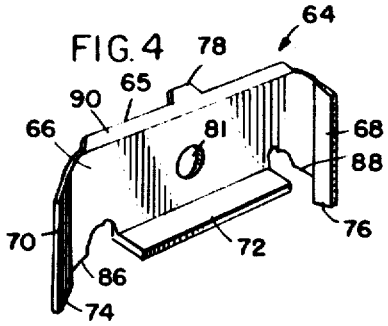
FIG. 4 is a perspective view of the fastening clip.

Referring now more specifically to FIG. 4, a fastening clip 64 of the fastening arrangement 14 is preferably formed from a heavy metal strip. The clip 64 provides a planar portion 66 having identical wing portions 68 and 70 angularly formed at both ends thereof preferably at 45° to the plane. A stiffening flange 72 is formed on the lower edge of the body portion 66 by severing the body portion in two places and bending the section therebetween at a right angle to the body portion where it not only serves as a manipulating handle but also serves as a nut stop. Wing portions 68 and 70 extend a substantial distance past the lower edge of the body portion 66 to define tab members 74 and 76. Camming surfaces 86 and 88 are provided on the inside of tabs 74 and 76 where they are inclined toward the ends of the tabs to direct and guide an angled insertion of the tabs snugly into slots and position the ends of the tabs properly in the apertures 44 and 46 when the clamp is assembled to the shelf.

The upper edge portion 90 of the planar body 66 is bent slightly in the direction of the support columns and includes a centrally located tab 78 received in aperture 48 of the shelf for stressing the shelf towards the column. An aperture 81 is centrally formed through the body portion 66 for alignment with the aperture 56 in the supporting columns when the clip 64 is properly positioned in the shelf ready for securement. This securement is best shown in FIGS. 7 and 10 wherein clip 64 is resiliently held to each of the corner portions of the shelves 10 and a bolt 80 is inserted through both apertures 56 and 81 to receive the nut 82 which is held against turning by flange 72.

Sufficient clearance around the hole 81 is provided so that the bolt 80 can be initially canted enough for the nut 82 to be started and threadably engage the bolt a short distance before the flange 72 becomes effective to hold it against turning while the bolt is being further tightened.

To install the clip 64 in the corner of the shelf, the clip is held in an angular position and tabs 74 and 76 are introduced into the apertures 44 and 46 respectively in the side flanges 20 and 22. The clip is then brought square to the plane 18 of the shelf 10 and this forces the tab 78 into alignment and into aperture 48 in the top of the shelf 10.

Since the side and end flanges 20 and 22 and the planar portion 18 flex with respect to one another at the corner juncture, the tabs 74 and 76 and flanges are forced into a snug relationship in which they are locked by the tab 78 when it snaps home in aperture 48. There is sufficient flexing of these members to permit the tab 78 to be easily moved into and held in this ultimate position. As best seen in FIG. 10, the clip 64 when in position is diagonally disposed between the side and end flanges with the wing portions in the plane of the flanges and as seen in FIG. 7, the uppermost edge 65 of the clip 64 supports the planar portion 18 of the shelf adjacent the recessed openings 38.

Figure 5:
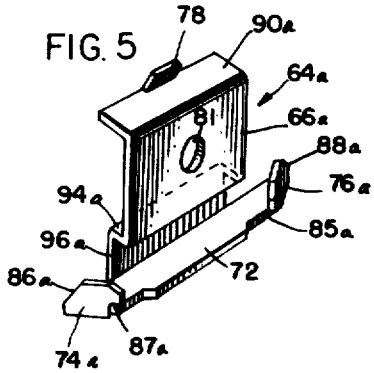
FIG. 5 is a perspective view of another embodiment of the fastening clip.

FIG. 5 discloses another embodiment 64a of clip 64 of the fastening arrangement 14. The clip is preferably formed from a heavy metal strip, and provides a planar body portion 66a, a narrow web portion 94a at right angles to the body portion 66a, which not only serves as a plate stiffener, but also as a nut stop. Another planar body portion 96a is formed at right angles to the web portion 94a and is parallel to and extending away from body portion 66a. Flange portion 72a is formed by a right angle bend to portion 96a parallel to and doubling back on web portion 94a, and forms the bottom of the clip. The bottom 72a extends beyond the sides of the body portion 66a of the clip and at both extremities has bent up tabs 74a and 76a disposed at right angles to the bottom 72a and preferably at 45° to the plane body portion 66a. The tabs 74a and 76a have a camming edge 86a and 88a which serve as guides for the tabs when the clip is slipped into position and are notched at 85a and 87a on their remote edges to prevent unintentional release. The upper portion 90a is at the top of the body portion 66a and disposed preferably at right angles to portion 66a in the same direction as web portion 94a. Extending from the surface 90a and at an acute angle with the top thereof is formed another tab 78 which engages aperture 48 in shelf 10 and when assembled stresses the shelf toward the supporting column 12. An aperture 81 is centrally formed through the body portion 66a for alignment with the aperture 56 in the support column when the clip 64a is properly positioned in the shelf, referring to FIG. 8, clip 64a as disclosed by FIG. 5, is securely held in each corner of the shelf by the notched tabs 74a and 76a and a bolt 80 is inserted through both apertures 56 and 81 to receive the nut 82 which is held against turning by the web portion 94a.

To assemble, all tabs (74a, 76a and 78) are aligned with their corresponding apertures (46, 44 and 48) in the shelves and are then forced into the apertures. As all tabs enter their apertures from the same direction, a single force in that direction will secure the clip. When in position, body portion 66a is diagonally disposed between the side and the end flanges with tabs 74a and 76a in the plane of the flanges and the uppermost surface 90a supporting the planar portion 18 of the shelf adjacent to the recessed opening 38.

Figure 6:
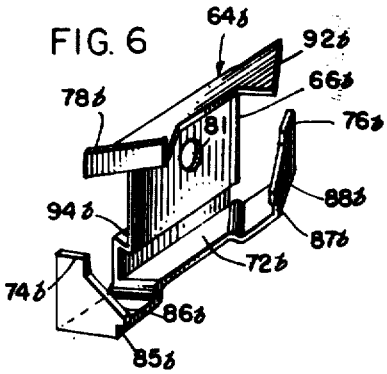
FIG. 6 is a perspective view of a further embodiment of the fastening clip.

FIG. 6 discloses another embodiment of clip 64 of the fastening arrangement 14. The clip 64b, also preferably formed from a heavy metal strip, has a planar body portion 66b having an upper portion 90b formed at right angles to the portion 66b, a lower portion 72b also formed at right angles to 66b and in the same direction as portion 90b and parallel to it. Two relationships of elements are contemplated in which one is the mirror of the other where the shelf flanges differ. One will be described wherein body portion 66b has two right angle bends forming a narrow portion 94b that serves as a plate stiffener and also a nut stop. Both portions 72b and 90b extend beyond the body portion 66b of the clip. At the ends of portion 72b tabs 74b and 76b are bent toward portion 90b. Tabs 74b and 76b are disposed at an angle of about 45° to the planar surface 66b so they lie in the same plane as the shelf flanges while portion 66b extends diagonally to the flanges 20 and 2. The internal edge of tabs 74b and 76b have camming surfaces 86b and 88b to serve as guides and draw the flanges and clip tightly together. At the base of the surfaces 86b and 88b spaces 85b and 87b are notched out to provide shoulders which hold the clip in place when assembled.

Portion 90b of the clip has a bearing surface at either end which serves to stress the shelf in the direction of the supporting column thereby insuring rigidity when bolt 80 is tightened. The edge 92b at one end of the upper portion 90b serves as a bearing surface engaging in the corner between the top plane 18 and side flange 22 of the shelf 10, and the other end of the upper portion 90b is constructed to engage in the upper corner contour of the top portion 18 and side flange 20 of the shelf 10. In this particular instance the bearing portion 78b is offset from the portion 90b and formed at right angles to it. Both bearing members are disposed at approximately 45° to the plane of portion 66b. An aperture 81 is centrally formed through the body portion 66b for alignment with the apertures 56 in the support column when the clip 64b is properly positioned in the shelf.

Figure 9:
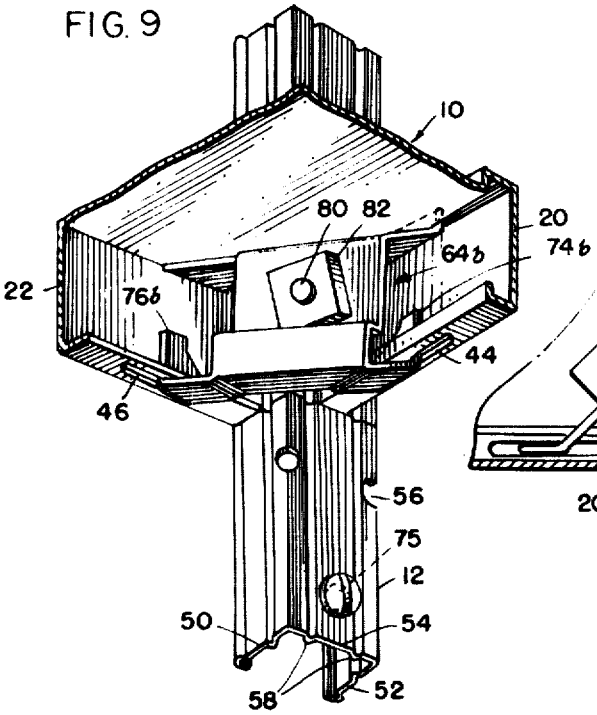
FIG. 9 is a fragmentary perspective view illustrating the relationship of the shelf shown in FIG. 3 when in the secured position held by the fastening clip of FIG. 6 against a supporting column.
Figure 11:
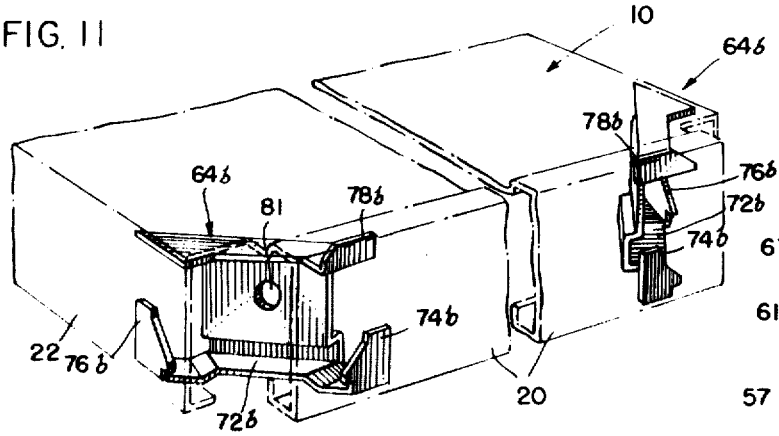
FIG. 11 is a front perspective view of the clip of the embodiment of FIG. 6 illustrating the relationship of the clip support within the shoulder of the shelf.

Referring to FIG. 9, clip 64b as disclosed by FIG. 6 is securely held in each corner of the shelf by the notched tabs 74b and 76b. To assemble, tabs 74b and 76b are aligned with the corresponding apertures 46 and 44 in the shelves, with bearing portion 78b on the side of the shelf having the shoulder 32, as shown in FIG. 11. The tabs are forced through apertures by pressure thereon towards the shelf top 18. The camming surfaces 86b and 88b draw the sides inwardly under stress and they snap back into the spaces 85b and 87b when reached whereby portion 66b is diagonally disposed between the side and end flanges with tabs 74b and 76b in the plane of the flanges. Surface 90b supports planar shelf surface 18 adjacent to the recessed opening 38 and added support is offered by surface 72b which supports the flange surface adjacent to the recessed opening 38.

Figure 8:
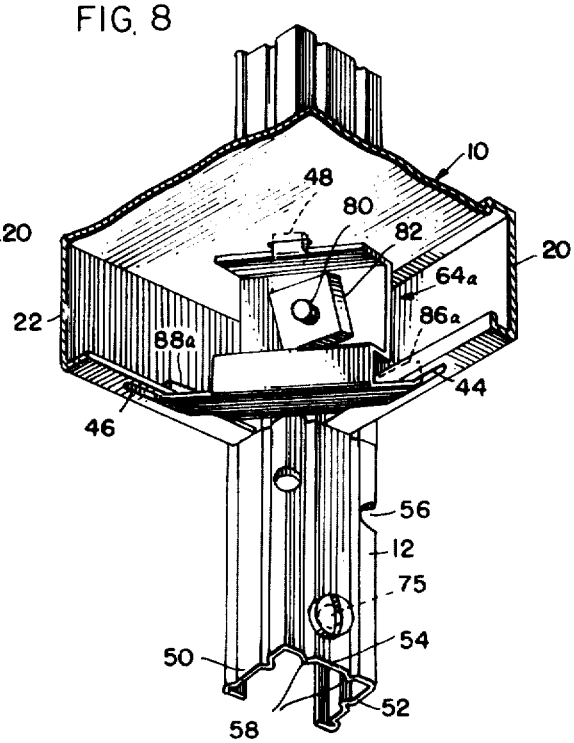
FIG. 8 is a frangmentary perspective view illustrating the relationship of the shelf shown in FIG. 3 when in the secured position held by the fastening clip of FIG. 5 against a supporting column.

Referring to all three embodiments as shown in FIGS. 7, 8 and 9, once the clip 64 is properly positioned in the corner of the shelf, shelf 10 is clamped to the supporting column 12 by a nut 82 and bolt 80 combination. A bolt 80 is inserted through one of the apertures 56 in the supporting column and the aperture 81 in the fastener clip 64 and threadably engages a nut 82. Referring to FIG. 7, the nut 82 after being started on the bolt is secured thereafter against rotation by physical engagement with the retaining plate 72 as the bolt is rotated, and with surfaces 94a in FIG. 8 and 94b in FIG. 9 serving the same purpose, thus necessitating the use of only a screwdriver to complete the installation. The head portion 84 of the bolt 80 bears against the contoured surfaces of the concaved ribs 58 in a side wall and rear wall of the support column as the drawing force of the nut and bolt combination forces the end edges of the end and side flanges, defining the recessed opening 38, into solid abutting contact with the side wall and rear wall of the supporting column. By disposing and clamping all contacting abutting surfaces normal to one another, the shelf is rigidly secured to the supporting column against movement in any plane and the wide spread of the mating edges and sides, due to their rectangular configuration, permits considerable force to be extended over a wide spread area giving exceptionally good stability and rigidity to the interconnection of the shelf 10 with the supporting column 12.

Figure 12:
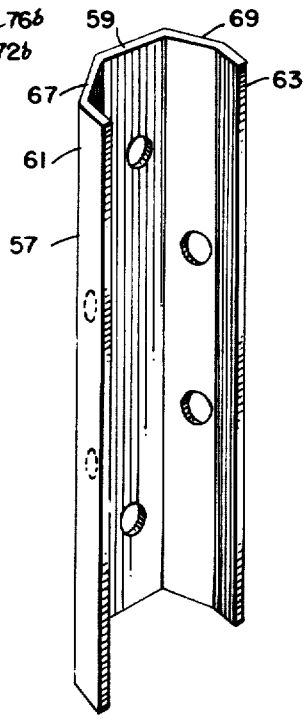
FIG. 12 is a front perspective view of the supporting column connector.
Figure 13:
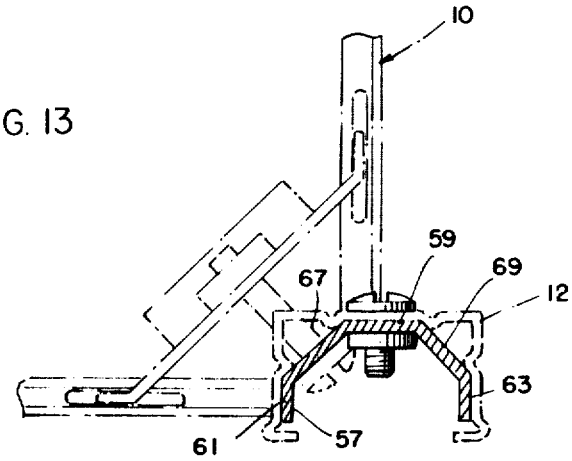
FIG. 13 is a top view of the supporting column connector shown in assembled relationship within the supporting column.

To facilitate handling and shipping, the supporting columns are manufactured in lengths equal to or less than the length of the shelves and are connected upon assembly of the shelves to provide the full size shelving arrangement of FIG. 1. The supporting column connecting device is best seen in FIGS. 12 and 13. The connector 57 is characterized by a modified U-shaped channel configuration preferably formed from a heavy metal strip. It provides a planar portion 59 having identical wing portions 61 and 63 preferably bent at 45° to portion 59 to give added strength to the planar portion 59, and identical portions 67 and 69 extending from the wings at 45° and perpendicular to the base 59 which also increase the rigidity of the connector and follow the inside contour of the supporting column.

When assembled to the supporting columns, rear portion 59 of the connector bears against the back wall 54 of the two abutting support columns, and portions 65 and 67 of the connector lie in the same plane as side walls 50 and 52. They serve to prevent rotation about the juncture and offseting of their end edges at the juncture while at the same time stiffening the joint against deflection. Each connector 57 is secured to overlap the abutting ends of the supporting columns by a bolt 77 and nut 79 arrangement, the bolt passing through aperture 75 of the column then through aperture 71 located in portion 59 of the connector. The nut 79 will bear against rear portion 59 and is of such size that when the bolt 77 is turned the nut 79 will be prevented from turning by contact with wing portions 61 and 63 of the connector, thereby requiring the use of only a screwdriver for asssembly.

Wing portions 61 and 63 of the connector bear against the reinforcing concave ribs 58 of the support column and contain apertures 73 which will be aligned with apertures 56 of the support column to permit bolt 80 to pass through both apertures and allow the shelves to be attached throughout the length of the connecting supporting columns including the area of the connector. The placing of a shelf at the juncture of the supporting columns will tend to further strengthen and rigidify the connection.

To assemble, the connector must enter a supporting column through an end and be slid into position of bolt aperture alignment. The wing portions 67 and 69 bearing against the side walls 50 and 52 of the supporting column will hold the connector in place while the other adjoining supporting column is slid over the extending part of the connector until it abuts the first column. All apertures should then be in line and ready to receive bolt 77 for securement.

From the foregoing, it will be seen that a shelving construction has been provided which may be readily set up into a rugged, rigid form and securely held in such form with a minimum of time, effort and tools. By providing a fastening clip 64 that is secured in position by the three mutually perpendicular planes of the side and end flanges and the planar surface of the shelf, not only will the corner portions of the shelves be greatly increased in strength and rigidity, but the drawing force created, as the bolt 80 is threaded into the nut 82, will be equally distributed between the adjacent end and side flanges and the planar surface of the shelf rigidifying the clamping of the shelf to the support column. Further, when the fastening clip 64 is snapped into position at the corner of the shelf, securement against subsequent disengagement of the clip and rigidity of the corner is greatly enhanced as the weight on the shelf increases.

It is further readily understood that the recessed openings 38 not only aid in providing alignment, engagement and stability to the shelving construction, but the ends of each flange are cut back a distance slightly greater than the thickness of the flange normal thereto so that the shelves may be placed bottom to bottom with the flanges meeting in the offset relationship with the support columns packed diagonally of the shelves therebetween, to form a compact, easily packaged unit in which the com ponents are interlocked against slipping or sliding.

Additionally, the angular configuration of the side flanges functions as a supporting beam for the width of the shelf and in conjunction with the contoured supporting columns and the simple fastening arrangement, an exceptionally lightweight shelving unit is provided capable of supporting weight in excess of that expected of a heavier shelving construction.

The construction herewith described and disclosed may be utilized in numerous applications and in a variety of specific structures, while its ease of manufacture and assembly, its clean and attractive outline and freedom from exposed edges make it particularly useful in all installations where metal helving is currently in use.

What is claimed is:

1. A vertically adjustable metal shelving assembly comprising:

a shelf having a planar portion and a pair of depending side flanges and end flanges, said side flanges and end flanges terminating in square ends a spaced distance from each other at the corners of the shelf to define recessed shelf corners, said flanges having vertically oriented apertures therein spaced from said square ends, cross-sectionally identical vertical support columns having parallel laterally extending side portions interconnected by a cross wall received in said recessed shelf corners against the square ended flanges, a plurality of vertically spaced apertures formed through columns at the junctures of said side portions and interconnecting wall, connector means fitting internally in the supporting columns for vertical connection thereof end to end in abutting weight bearing relationship, a fastening clip disposed beneath the planar surface of the shelf adjacent the recessed opening at the corner thereof and terminally engaging in said flange apertures at a right angle to said flanges, said fastening clip having a formed aperture intermediate said flange engagements in alignment with one of the vertically spaced apertures in the support columns, and releasable securing means rigidly securing the shelf to the support column interconnecting the column and fastening clip at said aligned apertures for securing the shelf rigidly to said support column through said formed aperture with said squared ends under stress squaring the flanges to the column.

2. A vertically adjustable metal shelving assembly comprising:

a shelf having a planar portion and a pair of depending side flanges and end flanges, said side flanges and end flanges at each corner terminating in planar edges disposed at right angles to each other and spaced from each other to define recessed shelf corners, said flanges having apertures therein spaced from said planar edges, vertical support columns having parallel side portions interconnected by a cross wall and received in said recessed shelf corners against the planar edges, a plurality of vertically spaced apertures formed through the columns at the junctures of said side portions and interconnecting wall, a fastening clip disposed beneath and engaging the planar surface of the shelf adjacent the recessed opening at the corner thereof and extending directly between and terminally engaging in said flange apertures at right angles to said flanges, said fastening clip having an aperture intermediate said flange engagements in alignment with one of the vertically spaced apertures in the support columns, and releasable securing means rigidly securing the shelf to the support column interconnecting the column and fastening clip at said aligned apertures for securing the shelf flanges rigidly against said support column walls through said aperture with said planar edge under stress squaring the flanges to the column.

3. A vertically adjustable metal shelving assembly comprising:

a shelf having a planar portion and a pair of depending side flanges and end flanges, said side flanges and end flanges terminating in square ends a spaced distance from each other at the corners of the shelf to define recessed shelf corners, said flanges having apertures therein spaced from said square ends, said planar portion having an aperture therein intermediate said flange apertures at each corner, vertical support columns having parallel outwardly extending side portions interconnected by a cross wall received in said recessed shelf corners against the square ended flanges, a plurality of vertically spaced apertures formed through columns at the junctures of said side portions and interconnecting wall, a fastening clip disposed beneath the planar surface of the shelf adjacent the recessed opening at the corner thereof engaging in said planar portion aperture and terminally engaging in said flange apertures at right angles with respect thereto, said fastening clip having a formed aperture intermediate said flange engagements in alignment with one of the vertically spaced apertures in the support columns, and releasable securing means rigidly securing the shelf to the support column interconnecting the column and fastening clip at said aligned apertures for securing the shelf rigidly to said support column through said formed aperture with said squared ends under stress squaring the flanges to the column.

4. In a metal shelving assembly having a shelf with tubular flanges with apertures therein and a support column with two walls at a right angle with respect to each other, an integral shelf retaining clip having an intermediate planar wall portion with an aperture therethrough, an offset member forming a shoulder spaced from and facing said aperture to reinforce said intermediate portion and support a threaded element against rotation concentric with said aperture, end portions extending beyond said offset member and disposed at an angle with respect thereto and in planes normal to each other for insertion into said flange apertures, cam means along opposite edges of said end portions passing through said flange apertures to engage said flanges at adjacent ends of said flange slots and draw the flanges towards each other at said flange apertures during insertion in the apertures, and means interlocking with said shelf for holding said end portions in said flange apertures under tension established in said flanges by said end portions.

5. The construction called for in claim 4 in which said securing means includes hook elements beyond said cam means engaging said flanges at said apertures in latching relationship engageable and releasable in a vertical direction.

6. The construction called for in claim 4 in which an upper part of said intermediate portion engages the lower side of the shelf in weight supporting relationship.

7. A metal shelving assembly comprising:

a shelf having a planar portion and a pair of depending peripheral opposing side flanges and end flanges, said side flanges and end flanges terminating a spaced distance from each other at the corners of the shelf defining recessed openings, a plurality of support columns, each having parallel side portions interconnected by a wall, one of said side portions engaging one of said side flanges and the wall engaging one of said end flanges of the shelf at a corner, and securing means holding the shelf to the suport columns with said side portions against said side flanges and said end flanges against said wall under a stress squaring each to the other respectively; and in which the flanges have apertures therein, and said securing means includes a shelf retaining clip having an intermediate planar wall portion with an aperture therethrough comprising an offset member forming a shoulder spaced from and facing said aperture to reinforce said intermediate portion against forces normal thereto and hold a nut against rotation, end portions extending beyond said offset member and disposed at an angle with respect thereto and in planes normal to each other for insertion into said flange apertures, cam means along opposite edges of said end portions to engage said flanges at adjacent ends of said flange slots to draw the flanges towards each other at said flange apertures during insertion in the apertures, and means interlocking with said shelf for holding said end portions in said flange apertures under tension established in said flanges by said end portions.

8. In a metal shelving assembly, a shelf having a planar article supporting shelf portion and a plurality of depending peripheral flanges.

a pair of said flanges being aligned at their adjacent ends in predetermined spaced relationship at a corner of the shelf to define a vertically extending recessed opening, a support column having parallel sides interconnected by a rear wall disposed in a predetermined angular relationship complementary to said adjacent ends of said pair of flanges.

a plurality of vertically spaced apertures formed in the support column disposed in registration with said recessed opening, and securing means including an angular clip having an aperture centrally formed therethrough and vertically extending tab portions formed thereon received in said flanges and in engagement with said planar shelf portion adjacent the recessed opening in weight supporting relationship, and a threaded member extending through one of the apertures of the support column and the aperture in said clip, said threaded member engaging a threaded element carried by the clip to rigidly clamp the ends of the shelf flanges endwise to the support column.

9. In a vertically adjustable metal shelving assembly:

a horizontal shelf having an article supporting planar shelf portion with depending side and end flanges terminating a predetermined distance from the corner defining a recessed opening and leaving apertures therethrough proximate to the opening, supporting columns having parallel extending side walls interconnected by and perpendicular to a rear wall, a plurality of vertically spaced apertures formed in the support column at the juncture of said side walls and rear wall, ribs formed convexly in both the side walls and rear wall of said supporting column, two apertures formed in the rear wall of said supporting column a predetermined distance from each end, a fastening clip disposed beneath the planar surface of the shelf adjacent the recessed openings at the corners thereof comprising, a planar body portion with symmetrically identical wing portions extending from each side, said wing portions extending below the body to form tabs which engage in said apertures in the flanges for correct positioning and securement of the clip, a tab centrally located on the planar body portion which engages an aperture in the article supporting portion of the shelf, said central portion of the body of the clip having an aperture located therein for alignment with the apertures of the supporting column and a flange formed from the body portion of the clip at right angles thereto, and threaded means extending through one of the apertures of the supporting column and the aperture of said clip to rigidly clamp the shelf to the supporting column.

10. A vertically adjustable metal shelving assembly comprising:

a shelf having a planar portion and a plurality of depending peripheral flanges, a pair of said flanges being aligned in a predetermined spaced relationship at a corner of the shelf defining a recessed opening, said flanges having an L-shaped configuration including an outer portion and a lower inwardly directed portion, retaining apertures formed through the lower portion of the flanges adjacent the recessed opening, support columns having parallel outwardly extending side portions interconnected by a rear wall in a predetermined angular relationship complementary to said flanges, a plurality of vertically spaced apertures formed through the juncture of said extending side portions with the rear wall, an integral shelf retaining clip having an intermediate planar wall portion with an aperture therethrough, an offset member forming a shoulder spaced from and facing said aperture to reinforce said intermediate portion and hold a nut against rotation, end portions extending beyond said offset member and disposed at an angle with respect thereto and in planes normal to each other for insertion into said flange apertures, cam means along opposite edges of said end portions to engage said flanges at adjacent ends of said flange slots to draw the flanges towards each other at said flange apertures during insertion in the apertures, and means interlocking with said shelf for holding said end portions in said flange apertures under tension established in said flanges by said end portions, and a releasable securing means engaging said column and said fastening clip to rigidly clamp the shelf to the supporting column.

11. A metal shelving assembly comprising:

a shelf having a planar portion and a pair of depending peripheral opposing side flanges and end flanges terminating a spaced distance from each other at each corner of the shelf defining a recessed opening, said side and end flanges having an L-shaped configuration including an outer portion and a lower portion, first retaining apertures formed through the lower portion of the end flanges adjacent the recessed opening, a fastening clip having an aperture centrally formed therethrough including a body portion terminated at each in portions disposed at right angles thereto, said portions comprising an upper portion having a flat supporting surface, a bearing surface, and an ear bent upwardly from the portions, and a lower portion containing retaining tabs bent upwardly from the portion, said fastening clip disposed beneath the planar surface of the shelf adjacent the recessed opening, said retaining tabs on said fastening clip engaging said first apertures and the supporting surfaces supporting the planar surface of the shelf adjacent the recessed opening and said ear aligned with the shoulder portion of the shelf providing support and stiffening of the shoulder, support columns having parallel outwardly extending side portions interconnected by a rear wall, a plurality of vertically spaced securing apertures formed through the juncture of said extending side portions with the rear wall, and two apertures formed in the rear wall at both ends of the supporting column, a connector having a planar rear portion with identical angularly extending side wing portions containing apertures in said wing portions which align with securing apertures in the supporting column and apertures in the rear portion which align with apertures in rear wall of supporting column, a means of rigidly securing said connector with vertical abutting supporting columns, and a releasable securing means engaging said column and said fastening clip to rigidly clamp the shelf to the supporting column.

12. A metal shelving assembly comprising:

a shelf having a planar portion and a plurality of depending peripheral flanges, a pair of said flanges being aligned in a predetermined spaced relationship at one corner of the shelf defining a recessed opening, said flanges having an L-shaped configuration including an outer portion and a lower inwardly directed portion, retaining apertures formed through the lower portion of the flanges adjacent the recessed openings, a fastening clip having an aperture formed centrally therethrough including a body portion having an upper supporting portion extending at right angles therefrom and a lower portion also extending at right angles from the body, said upper portion containing bearing surfaces at the extremities thereof, said lower portion containing upwardly bent self-locking retaining tabs, said body portion containing a narrow web flange in the lower portion thereof, said fastening clip being disposed beneath the planar surface of the shelf adjacent the recessed opening and having retaining tabs engaging in the retaining apertures in the flanges with the bearing surfaces of the upper portion stressing the shelf towards the supporting column, support columns having parallel outwardly extending side portions interconnected by a rear wall having aperture and disposed in a predetermined angular relationship complementary to said flanges, said side portions and rear wall having laterally spaced concaved ribs formed the length thereof, a plurality of vertically spaced securing apertures formed through the junctures of said extending side portions with the rear wall, the rear wall of said supporting column having an aperture formed therethrough at both ends, a connector plate having a planar rear portion with an aperture and identical side wings angled therefrom and side wall angled from said wings, a plurality of vertically spaced apertures formed through said side wings, said apertures spaced corresponding to vertically spaced apertures of supporting column, two apertures formed through the rear wall of said connector corresponding to apertures formed in rear wall and at the ends of the supporting columns, said connector being able to be inserted within the U-shaped configuration of two vertically abutting supporting columns, giving support against any movement at the juncture of the supporting columns, and securing means received in the aperture in the rear wall of said supporting column and the aperture in rear wall of said connector, and securing said fastening clip and shelf to said supporting column to rigidly secure the shelf and connector to the support column as a unitized construction.

13. In a metal shelving assembly, a shelf having a planar portion and a plurality of depending peripheral flanges, a pair of said flanges being aligned in predetermined spaced relationship at a corner of the shelf to define a vertically extending recessed opening, retaining apertures formed through the lower portion of the flanges and the planar portion of the shelf adjacent the recessed openings, a support column having parallel sides interconnected by rear wall in a predetermined angular relationship complementary to the ends of said pair of flanges, a plurality of vertically spaced apertures formed in the support column disposed in registration with said recessed opening, and securing means including an angular clip having an aperture centrally formed therethrough and vertically disposed tab portions formed thereon received in said flange and said planar portion apertures adjacent the recessed openings, and a bolt member extending through one of the apertures of the support column and the aperture of said clip, the shank of said bolt engaging a threaded element to rigidly clamp the end of the flanges against the support column.

14. A metal shelving assembly comprising:

a shelf having a planar portion and a plurality of depending peripheral flanges, a pair of said flanges being aligned in predetermined spaced relationship at a corner of the shelf defining a recessed opening, said flanges having an L-shaped configuration including an outer portion and a lower inwardly directed portion, retaining apertures formed through the lower portion of the flanges and the planar portion of the shelf adjacent the recessed openings, a fastened clip having an aperture formed centrally therethrough including a body portion having wing portions extending angularly therefrom, a retaining tab extending from each of said wing portions and extending upwardly from said body portion, said fastening clip disposed beneath the planar surface of the shelf adjacent the recessed opening, said retaining tabs on said fastening clip engaging the retaining apertures in the flanges and the retaining aperture in the planar portion of the shelf, support columns having parallel outwardly extending side portions interconnected by a rear wall in a predetermined angular relationship complementary to said flanges, a plurality of vertically spaced securing apertures formed through the junctures of said extending side portions with the rear wall, and a releasable securing means engaging said column and said fastening clip to rigidly clamp the ends of said pair of flanges against a side and rear wall of the support column.

15. A metal shelving assembly comprising:

a shelf having a planar portion and a pair of depending peripheral opposing side flanges and end flanges terminating a spaced distance from each other at each corner of the shelf defining recessed openings, said side and end flanges having an L-shaped configuration including an outer portion and a lower portion, first retaining apertures formed through the lower portion of the end flanges adjacent the recessed openings, second retaining apertures formed through the lower portion of the side flanges adjacent the recessed openings, third retaining apertures formed through the planar portion of the shelf adjacent the recessed openings, a fastening clip having an aperture centrally formed therethrough including a body portion having wing portions extending angularly therefrom, a retaining tab extending from each of said wings and a retaining tab extending upwardly from said body portion, said fastening clip disposed beneath the planar surface of the shelf adjacent the recessed opening, retaining tabs on said fastening clip engaging said first and second retaining apertures in the flanges and the retaining aperture in the planar portion of the shelf, support column having parallel outwardly extending side portions interconnected by a rear wall, a plurality of vertically spaced securing apertures formed through the junctures of said extending side portions with the rear wall, and a nut and bolt combination, said bolt inserted through a securing aperture in the support column and the aperture in the fastening clip and threadedly engages the nut to secure the ends of the side and end flanges defining the recessed opening against the side portion and rear wall of the support column received therein.

16. In a metal shelving assembly, a shelf having a planar portion and a plurality of depending peripheral flanges, a pair of said flanges being aligned in predetermined spaced relationship at a corner of the shelf to define a vertically extending recessed opening, retaining apertures formed through the lower portion of the flanges and the planar portion of the shelf adjacent the recessed openings, a support column having parallel sides interconnected by a rear wall in a predetermined angular relationship complementary to said pair of flanges, said sides and rear wall having laterally spaced concaved ribs formed the length thereof, a plurality of vertically spaced apertures formed in the support column disposed in registration with said recessed opening, and securing means including an angular clip having a centrally disposed aperture formed therethrough and vertical tab portions formed thereon that are received in said flange and said planar portion adjacent the recessed opening and a bolt member extending through one of the apertures of the support column and the aperture in said clip, the head of said bolt rotatably bearing against the outer surface of a concaved rib on said side and rear wall of the support column, and the shank of said bolt engaging a threaded element to rigidly secure the shelf to the support column.

17. A metal shelving assembly comprising:

a shelf having a planar portion and a plurality of depending peripheral flanges, a pair of said flanges being aligned in predetermined spaced relationship at a corner of the shelf defining a recessed opening, said flanges having an L-shaped configuration including an outer portion and a lower inwardly directed portion, retaining apertures formed through the lower portion of the flanges and the planar portion of the shelf adjacent the recessed openings, a fastening clip having an aperture formed centrally therethrough including a body portion having wing portions extending angularly therefrom, a retaining tab extending from each of said wing portions and a retaining tab extending upwardly from said body portion, said fastening clip disposed beneath the planar surface of the shelf adjacent the recessed opening, retaining tabs on said fastening clip engaging the retaining apertures in the flanges and the retaining aperture in the planar portion of the shelf, support columns having parallel outwardly extending side portions interconnected by a rear wall in a predetermined angular relationship complementary to said flanges, said side portions and rear wall having laterally spaced concaved ribs formed the length thereof, a plurality of vertically spaced securing apertures formed through the junctures of said extending side portions with the rear wall, and a nut and bolt combination, said bolt inserted through an aperture in the support column and the fastening clip, head portion of the bolt bearing against the outer surface of a concaved rib on said side portion and rear wall of the support column, and the shank of the bolt engages the nut to rigidly secure the shelf to support column.

18. A metal shelving assembly comprising:

a shelf having a planar portion and a pair of depending peripheral opposing side flanges and end flanges, said side flanges and end flanges terminating a spaced distance from each other at the corners of the shelf defining recessed openings and having retaining apertures normal to the plane of said planar portion spaced from the recessed opening, a plurality of support columns, each having parallel outwardly extending side walls interconnected by a rear wall with a front opening between the side walls opposite the rear wall and a corner aperture at the edge of the back wall, one of said side walls engaging a side flange and the rear wall engaging an end flange of the shelf at a corner, and securing means securing the shelf to the support colums including a bracket at each column interconnecting said flanges to span the recessed opening and having tabs engaging in said apertures and a nut and bolt assembly received through said opening interconnecting the bracket and column for drawing the bracket towards the support column to hold the terminal ends of the flanges in clamped abutting relationship against said side and rear walls of the support column, said one of said side walls and rear wall having parallel ribs extending towards each other defining shoulders supporting the bolt for rotation thereon about the axis of said corner aperture and accessible for rotation through said front opening, and said bracket including means for preventing rotation of said nut.

19. In a metal shelving assembly having a shelf with tubular flanges with apertures therein and a support column with two walls at a right angle with respect to each other, an integral shelf retaining clip having an intermediate planar wall portion with an aperture therethrough, an offset member forming a shoulder spaced from and facing said aperture to reinforce said intermediate portion and support a threaded element against rotation concentric with said aperture, end portions extending beyond said offset member and disposed at an angle with respect thereto and in planes normal to each other for insertion into said flange apertures, cam means along opposite edges of said end portions to engage said flanges at adjacent ends of said flange slots to draw the flanges towards each other at said flange apertures during insertion in the apertures, and means interlocking with said shelf for holding said end portions in said flange apertures under tension established in said flanges by said end portions, said clip on an upper part of said intermediate portion having an ear interlocking with said shelf at a point intermediate said flanges and apertures.

20. In an adjustable knockdown sheet metal shelving unit, in combination, an elongated upright corner post presenting a cross section defining a channel and including parallel side flanges and a connecting web portion, there being a series of vertically spaced holes in said corner post along the juncture region between one of the side flanges and the web portion, means along the edges of the side flanges for receiving a trim means therebetween, rib means within said channel bordering said holes, a generally rectangular horizontally disposed shelf having a depending marginal longitudinal flange extending along one longitudinal edge thereof and a depending marginal transverse flange extending along an adjacent transverse edge thereof, said depending flanges each being formed with a narrow inturned horizontally disposed rim flange portion, said shelf and depending flanges being cut away at a corner region of the shelf to receive the corner post with said one side flange of the corner post opposing an adjacent cut end edge of the longitudinal flange and with said web portion opposing an adjacent cut end edge of the transverse flange, a sheet metal corner clip disposed in said corner region of the shelf at the horizontal level of the depending flanges and extending diagonally between said depending flanges a spaced distance from said corner post, interengaging means on the opposite ends of said clip and said depending flanges respectively for securing the clip to said depending flanges to prevent inward collapse or outward spreading of the depending flanges, there being a central opening in said clip designed for selective horizontal register with said vertically spaced holes in the corner post and in such register with one of said holes, a fastening bolt element projecting through said central opening and registering hole including means for rotating it, a reaction nut threadedly recived on said bolt, and means to prevent rotation of said nut, said fastening bolt and nut being selectively received in supported relationship on said rib means with the other engaging said clip and serving to draw the corner clip and corner post toward each other and thus clamp the corner post against said adjacent end edges of the longitudinal and transverse depending flanges.

21. In an adjustable knockdown sheet metal shelving unit, the combination set forth in claim 20 and wherein said interengaging means on the opposite ends of the clip bears against the shelf within the inside face of the vertical portion of said depending flanges and is interengaged between the ends of the clip and the inturned rim flange portions.

22. In an adjustable knockdown sheet metal shelving unit, the combination set forth in claim 20, wherein each rim flange portion is formed with a slot therein in the corner region of the shelf, and wherein said interengaging means on the opposite ends of the clip and said depending flanges comprises a pair of latching tongues on the clip which project through said slots.

23. In an adjustable knockdown sheet metal shelving unit, the combination set forth in claim 20 and wherein said interengaging means on the opposite ends of the clip and said depending flanges comprises tongue and slot connections between the clip and inturned rim flange portions, and a pair of seating surfaces on said clip which bear against said depending flanges respectively at their regions of juncture with the horizontal shelf.

24. In an adjustable knockdwon sheet metal shelving unit, in combination, an elongated upright corner post presenting a channel-shape cross section and including parallel side flanges and a connecting web portion, there being a series of vertically spaced holes in said corner post along the juncture region between one of said side flanges and the web portion, said one side flange and web portion each being formed with a longitudinally extending internal reinforcing rib therealong, said ribs being spaced apart a slight distance and straddling said juncture region, a generally rectangular horizontally disposed shelf having a depeding marginal longitudinal flange extending along one longitudinal edge thereof and a depending marginal transverse flange extending along an adjacent transverse edge thereof, said depending flanges each being formed with a narrow inturned rim flange, said shelf and depending flanges being cut away at a corner region of the shelf to receive the corner post with said one side flange of the corner post opposing an adjacent cut end edge of the longitudinal flange and with said web portion opposing an adjacent cut end edge of the transverse flange, a sheet metal corner clip disposed in said corner region of the shelf at the horizontal level of the depending flanges, interengaging means on the opposite ends of said clip and said depending flanges respectively for securing the clip to said depending flanges to prevent inward collapse or outward spreading of the depending flanges, there being a central opening in said clip designed for selective horizontal register with said vertically spaced holes in the corner post and in such register with one of said holes, a fastening bolt projecting through said central opening and registering hole, and a reaction nut threadedly received on said bolt, said fastening bolt and nut being effective between said ribs and the clip and serving to draw the clip and corner post toward each other and thus clamp the corner post against said adjacent cut end edges of the longitudinal and transverse depending flanges.

25. In an adjustable knockdown sheet metal shelving unit, in combination, an elongated upright corner post presenting a channel-shape cross sections and including parallel side flanges and a connecting web portion, there being a series of vertically spaced holes in said corner post along the juncture region between one of said side flanges and the web portion, said one side flange and web portion each being formed with a longitudinally extending internal reinforcing rib therealong, said ribs being spaced apart a slight distance and straddling said juncture region, a generally rectangular horizontally disposed shelf having a depending marginal longitudinal flange extending along one longitudinal edge thereof and a depending marginal transverse flange extending along an adjacent transverse edge thereof, said depending flanges each being formed with a narrow inturned horizontal rim flange, said shelf and depending flanges being cut away at a corner region of the shelf to receive the corner post with said one side flange of the corner post opposing an adjacent end edge of the longitudinal flange and with said web portion opposing an adjacent end edge of the transverse flange, said rim flanges each being provided with a slot therein spaced a slight distance from the end edge of the associated depending flange, a sheet metal corner clip disposed in said corner region of the shelf at the horizontal level of the depending flanges and including a flat vertical body portion extending diagonally between said depending flanges, upper and lower horizontal flanges extending along the upper and lower edges respectively of said vertical body portion, upturned tongues at the opposite ends of said lower flanges extending vertically upwardly through said slots in the rim flanges and interlocking therewith for securing the clip to said depending flanges and preventing inward collapse or outward spreading of the shelf in supporting relationship, there being a central opening in said body portion of the clip in horizontal register with one of the holes in said corner post, a headed fastening bolt projecting through said central opening and registering hole, and a reaction nut threadedly received on said bolt, said fastening bolt and nut being effective between said ribs and the body portion of the clip and serving to draw the clip and corner post toward each other and thus clamp the corner post against said adjacent end edges of the longitudinal and transverse depending flanges.

26. In an adjustable knockdown sheet metal shelving unit, the combination set forth in claim 25 wherein the head of said fastening bolt bears against said ribs in bridging relationship and said nut bears against said body portion of the clip.

27. In an adjustable knockdown metal shelving unit, the combination set forth in claim 25, wherein said holes in the corner post have a transverse dimension less than the width of the head portion bordered by ribs on opposite sides that receive the shank portion of the fastening bolt therebetween whereby the bolt may be inserted endwise through a selected hole with its head portion received in supported relation on the bordering ribs.

28. A metal shelving assembly comprising a pair of *sheet metal* shelves each having a planar portion and a pair of depending peripheral opposing side flanges and end flanges, said side flanges and end flanges terminating *in sharply square end edges* a spaced distance from each other at two adjacent end corners of the shelves defining recessed openings *and having retaining apertures spaced from their ends,* a support column at each of said corners, each column having parallel side portions interconnected by a wall, the side flanges of the shelves engaging opposite side portions of each support column in alignment and the end flange interengaging the walls in parallel relationship at the corners, and securing means *including a snap-in clip having a centrally located opening and* spanning a side and end flange at each corner spaced from the adjacent support column *to engage the flanges at vertically spaced bearing points including retaining tab portions received in said apertures* for holding the shelves to the support columns with said side flanges endwise against said walls under a stress squaring each to the other respectively.

29. A vertically adjustable metal shelving assembly comprising a shelf having a planar portion and a pair of depending side flanges and end flanges, said side flanges and end flanges at each corner terminating in planar edges disposed at right angles to each other and spaced from each other to define recessed shelf corners, said flanges having apertures therein spaced from said planar edges, a vertical support column having parallel side portions interconnected by a cross wall and received in each of said recessed shelf corners against the planar edges, a plurality of vertically spaced apertures formed through each column at the junctures of said side portions and interconnecting wall, a fastening clip disposed beneath the planar surface of the shelf adjacent the recessed opening at the corner thereof and terminally engaging in said flange apertures at right angles to said flanges, said fastening clip having an aperture intermediate said flange engagements in alignment with one of the vertically spaced apertures in the support column, and releasable securing means rigidly securing the shelf to the support column interconnecting the column and fastening clip at said aligned apertures for securing the shelf flanges rigidly against said support column walls through said aperture with said planar edge under stress squaring the flanges to the column.

30. A *lightweight* metal shelving assembly comprising a *sheet metal* shelf having a planar portion and a pair of depending peripheral opposing side flanges and end flanges, said side flanges and end flanges terminating a spaced distance from each other at the corners of the shelf at planar cut *end* edges disposed at a right angle to each other defining recessed openings, a plurality of support columns, each having parallel side portions interconnected by a wall, one of said side portions engaging one of said side flanges and the wall engaging one of said end flanges of the shelf at a corner, and securing means *for each corner* including a *tension member and a diagonally disposed snap-in* clip *having a centrally formed opening receiving the tension member therethrough,*

*said clips having tab portions* engaging said flanges at a distance spaced from said planar cut edges thereof *and movable by said tension member* to [hold] *draw* the shelf to the support columns with said side portions against said side flange planar cut edge and said end flange planar cut edge against said wall under a stress squaring each to the other, respectively, in weight supporting relationship *between* [of] the shelf *and* [to] the support columns *against relative movement in any plane.*

31. A shelf retaining clip having an intermediate planar wall portion with an aperture therethrough comprising an offset member forming a shoulder spaced from and facing said aperture to reinforce said intermediate portion against forces normal thereto and hold a nut against rotation, end portions extending beyond said offset member and disposed at a 45° angle with respect thereto and in planes normal to each other, and cam means along opposite edges of said end portions terminating in notches providing retaining shoulders, one of said end portions terminating in an upstanding ear.

32. A vertically adjustable metal shelving assembly comprising a shelf having a planar portion and a plurality of depending peripheral flanges, pair of said flanges being aligned in a predetermined spaced relationship at a corner of the shelf defining a recessed opening, said flanges having an L-shaped configuration including an outer portion and a lower inwardly directed portion, retaining apertures formed through the lower portion of the flanges adjacent the recessed opening, support columns having parallel outwardly extending side portions interconnected by a rear wall in a predetermined angular relationship complementary to said flanges, a plurality of vertically spaced apertures formed through the juncture of said extending side portions with the rear wall, an integral shelf retaining clip having an intermediate planar wall portion with an aperture therethrough, an offset member forming a shoulder spaced from and facing said aperture to reinforce said intermediate portion and hold a nut against rotation, end portions extending beyond said offset member and disposed at an angle with respect thereto and in planes normal to each other for insertion into said flange apertures, cam means along opposite edges of said end portions to engage said flanges at adjacent ends of said flange slots to draw the flanges towards each other at said flange apertures during insertion in the apertures, means interlocking with said shelf for holding said end portions in said flange apertures under tension established in said flanges by said end portions, and a releasable securing means engaging said column and said fastening clip to rigidly clamp the shelf to the supporting column.

33. A metal stand comprising:

a horizontal shelf having a corner and a planar portion with peripheral flanges depending therefrom and terminating a spaced distance on opposite sides thereof to define a recessed opening at said corner, said flanges resiliently flexing towards each other when free to do so at said corner, an angular support column having parallel side portions interconnected by a rear wall, one side portion and the rear wall being disposed against and complementary to the ends of the depending flanges on opposite side of the recessed opening, a plurality of vertically spaced holes through the juncture of the side portion with the rear wall of the column, a clip member spanning said recessed opening having elements interlocking with said flanges at points spaced from their ends under resilient flexure thereof in assembled relationship with the shelf at each corner to engage the flanges and the planar shelf portion in weight supported relationship, each clip having an aperture centrally formed therethrough for alignment with one of the holes in the support column including a threaded means, and a threaded member engaged by said threaded means rigidly securing said clip member elements in said interlocking engagement and the flange ends of the shelf flanges against a side portion and rear wall of the support column.

*34. A vertically adjustable metal shelving assembly comprising a shelf having a planar portion and a pair of depending side flanges and end flanges,*

*said side flanges and end flanges at each corner terminating in planar cut edges disposed at right angles to each other and spaced from each other to define shelf corner recesses whose depth is greater than the thickness of any flange, said flanges having apertures therein spaced from said planar edges,*

*cross-sectional identical support columns having parallel laterally extending side portions interconnected by a cross wall and received in each of said shelf corner recesses against the planar edges,*

*connector means fitting internally in the supporting columns for vetrical connection thereof end to end in abutting weight bearing relationship,*

*a plurality of vertically and equally spaced apertures formed through each column at the junctures of said side portions and interconnecting wall,*

*a fastening clip disposed beneath the planar surface of the shelf adjacent each recessed opening at the corner thereof and terminally engaging in said flange apertures at right angles to said flanges,*

*said fastening clip having an aperture intermediate said flange engagements in alignment with one of the vertically spaced apertures in the support columns, and*

*releasable securing means through said aligned apertures rigidly securing the shelf to each support column interconnecting the column and fastening clip at said aligned apertures for securing the shelf flanges rigidly against said support column walls with said planar edges under stress squaring the flanges to the columns.*

*35. The combination called for in claim 34 in which the depth of said recessed shelf corners are greater than the thickness of any flange and the separate support columns are of a length receivable against the planar portion if within the confines of the shelf flanges.*

References Cited

The following references, cited by the Examiner, are of record in the patented file of this patent or the original patent.

UNITED STATES PATENTS

| | | | |
|---|---|---|---|
| 1,161,432 | 11/1915 | Wolf | 5—288 |
| 1,551,714 | 9/1925 | Tuschkan | 108—153 X |
| 1,952,111 | 3/1934 | Bales | 248—243 X |
| 2,304,481 | 12/1942 | Shannon | 108—153 |
| 2,516,933 | 8/1950 | Wallance | 108—156 X |
| 2,520,231 | 8/1950 | Anderson | 108—153 |
| 2,621,800 | 12/1952 | Neubauer | 211—148 X |
| 2,719,633 | 10/1955 | Rosenberg | 108—109 |
| 2,760,650 | 8/1956 | Franks | 211—148 |
| 2,788,096 | 4/1957 | Franks | 189—36 |
| 2,905,809 | 9/1959 | Pascucci | 189—36 |
| 2,935,210 | 5/1960 | Cohen | 108—106 |
| 2,984,362 | 5/1961 | Hamilton | 108—111 |
| 2,990,067 | 6/1961 | Bartlett | 108—144 |
| 3,018,862 | 1/1962 | Litteral et al. | 189—36 X |
| 3,056,507 | 10/1962 | Squires et al. | 108—106 |
| 3,065,860 | 11/1962 | Swanson | 108—106 |
| 3,082,711 | 3/1963 | Vetere | 108—107 |
| 3,139,045 | 6/1964 | Rojakovick | 108—109 |

JAMES T. McCALL, Primary Examiner

U.S. Cl. X.R.

108—107; 211—148; 248—243, 250

PO-1050
(5/69)

UNITED STATES PATENT OFFICE
CERTIFICATE OF CORRECTION

Patent No. RE 27,186 Dated October 12, 1971

Inventor(s) IRWIN J. FERDINAND et al

It is certified that error appears in the above-identified patent and that said Letters Patent are hereby corrected as shown below:

Column 17, line 73, in Claim 28, after "endwise" insert

-- against said side portions and said end flanges endwise -- line 74, in Claim 28, change "walls" to -- wall --

Signed and sealed this 14th day of November 1972.

(SEAL)
Attest:

EDWARD M.FLETCHER,JR.
Attesting Officer

ROBERT GOTTSCHALK
Commissioner of Patents